United States Patent
Miao et al.

(10) Patent No.: US 12,250,637 B2
(45) Date of Patent: Mar. 11, 2025

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 263 days.

(21) Appl. No.: 17/788,204

(22) PCT Filed: Dec. 23, 2019

(86) PCT No.: PCT/CN2019/127503
§ 371 (c)(1),
(2) Date: Jun. 22, 2022

(87) PCT Pub. No.: WO2021/127866
PCT Pub. Date: Jul. 1, 2021

(65) Prior Publication Data
US 2023/0337140 A1  Oct. 19, 2023

(51) Int. Cl.
*H04W 52/02* (2009.01)
*H04L 1/08* (2006.01)
*H04L 5/00* (2006.01)

(52) U.S. Cl.
CPC .......... *H04W 52/0274* (2013.01); *H04L 1/08* (2013.01); *H04L 5/0053* (2013.01)

(58) Field of Classification Search
CPC ..... H04W 52/0274; H04L 1/08; H04L 5/0053
See application file for complete search history.

(56) References Cited

U.S. PATENT DOCUMENTS

| | | | |
|---|---|---|---|
| 10,530,700 B2* | 1/2020 | Ho | H04L 49/351 |
| 2012/0314637 A1* | 12/2012 | Kim | H04L 1/1887 |
| | | | 370/311 |

(Continued)

FOREIGN PATENT DOCUMENTS

| | | |
|---|---|---|
| CN | 104871635 A | 8/2015 |
| CN | 109891947 A | 6/2019 |

(Continued)

OTHER PUBLICATIONS

Huawei, et al."Motivation for new SI proposal on 5G V2X", 3GPP TSG RAN Meeting #79, Agenda Item: 9.1.2, RP-180384, Chennai, India, Mar. 19-22, 2018 (14pages).

(Continued)

*Primary Examiner* — Michael Thier
*Assistant Examiner* — Nevena Zecevic Sandhu
(74) *Attorney, Agent, or Firm* — Sughrue Mion, PLLC

(57) ABSTRACT

Embodiments of the present disclosure provide a solution for sidelink discontinuous reception (DRX). In a method for communication, a first terminal device of terminal devices in a communication network obtains a sidelink DRX configuration. The first terminal device determines, from the sidelink DRX configuration, a sidelink DRX cycle including a first duration during which sidelink communications are allowed to be performed among the terminal devices and a second duration during which the sidelink communications are not allowed to be performed. The first terminal device performs, during the first duration, a sidelink communication with a second terminal device of the terminal devices. With the embodiments of the present disclosure, terminal devices can efficiently communicate with each other using sidelink DRX operations.

6 Claims, 7 Drawing Sheets

(56) References Cited

U.S. PATENT DOCUMENTS

| | | |
|---|---|---|
| 2018/0352508 A1 | 12/2018 | Fujishiro et al. |
| 2019/0097874 A1 | 3/2019 | Zhou et al. |
| 2019/0098542 A1* | 3/2019 | Tang ............... H04W 76/11 |
| 2019/0159279 A1* | 5/2019 | Sadiq ............... B29B 13/022 |
| 2020/0322980 A1* | 10/2020 | Fakoorian ........ H04W 76/11 |
| 2022/0385409 A1* | 12/2022 | Park ................. H04L 1/0026 |

FOREIGN PATENT DOCUMENTS

| | | |
|---|---|---|
| CN | 110383901 A | 10/2019 |
| CN | 110463299 A | 11/2019 |
| WO | 2018/064360 | 4/2018 |
| WO | 2018064477 A1 | 4/2018 |
| WO | 2018/202798 A1 | 11/2018 |

OTHER PUBLICATIONS

Japanese Office Action dated Oct. 3, 2023 in Application No. 2022-538840.

Sequans Communications, "Power efficient relay discovery maintenance and establishment", 3GPP TSG-RAN WG2 Meeting #97, R2-1701648 Agenda item: 9.1.2.2, Feb. 13-17, 2017, 9 Pages, Athens, Greece.

International Search Report for PCT/CN2019/127503 dated Sep. 24, 2020.

Written Opinion for PCT/CN2019/127503 dated Sep. 24, 2020.

Extended European Search Report dated Dec. 5, 2022 in Application No. 19957377.5.

Sequans Communications, "Discussion on paging relay and sidelink maintenance", 3GPP TSG-RAN WG2 Meeting #97bis R2-1703593, Spokane, USA, Apr. 3-7, 2017(8 total pages).

CN Office Action for CN Application No. 201980103588.4, mailed on Oct. 15, 2024 with English Translation.

Vice-Chairwoman (InterDigital), "Report of the LTE break-out session (ProSe, eDRX, V2X, Latred)", 3GPP TSG-RAN WG2 Meeting #92 R2-157012, Nov. 21, 2015, pp. 1-37.

* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2019/127503 filed Dec. 23, 2019.

FIELD

Embodiments of the present disclosure generally relate to the field of communication, and in particular, to a solution for discontinuous reception (DRX) in sidelink communications.

BACKGROUND

The latest developments of the 3GPP standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the Third Generation Partnership Project (3GPP) to meet new requirements associated with latency, reliability, security, scalability (for example, with Internet of Things), and other requirements. Some aspects of the 5G NR may be based on the 4G Long Term Evolution (LTE) standards.

Sidelink DRX is one of the objectives of 3GPP Release 17 to reduce power consumption for vulnerable road users (VRUs) in Vehicle to Everything (V2X) use cases and for User Equipment (UEs) in public safety and commercial use cases where power consumption in the UEs needs to be minimized. However, by far there are no feasible sidelink DRX communication schemes.

SUMMARY

In general, example embodiments of the present disclosure provide a solution for DRX in sidelink communications, also referred to sidelink DRX communications herein.

In a first aspect, there is provided a method for communication. The method comprises obtaining, at a first terminal device of terminal devices in a communication network, a sidelink DRX configuration. The method also comprises determining, from the sidelink DRX configuration, a sidelink DRX cycle including a first duration during which sidelink communications are allowed to be performed among the terminal devices and a second duration during which the sidelink communications are not allowed to be performed. The method further comprises performing, during the first duration, a sidelink communication with a second terminal device of the terminal devices.

In a second aspect, there is provided a method for communication. The method comprises determining, at a network device in a communication network, a sidelink DRX configuration indicating a sidelink DRX cycle including a first duration during which sidelink communications are allowed to be performed among terminal devices in the communication network and a second duration during which the sidelink communications are not allowed to be performed. The method also comprises transmitting the sidelink DRX configuration to a first terminal device of the terminal devices, such that the first terminal device performs a sidelink communication with a second terminal device of the terminal devices based on the sidelink DRX configuration.

In a third aspect, there is provided a terminal device. The terminal device comprises a processor and a memory storing instructions. The memory and the instructions are configured, with the processor, to cause the terminal device to perform the method according to the first aspect.

In a fourth aspect, there is provided a network device. The network device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
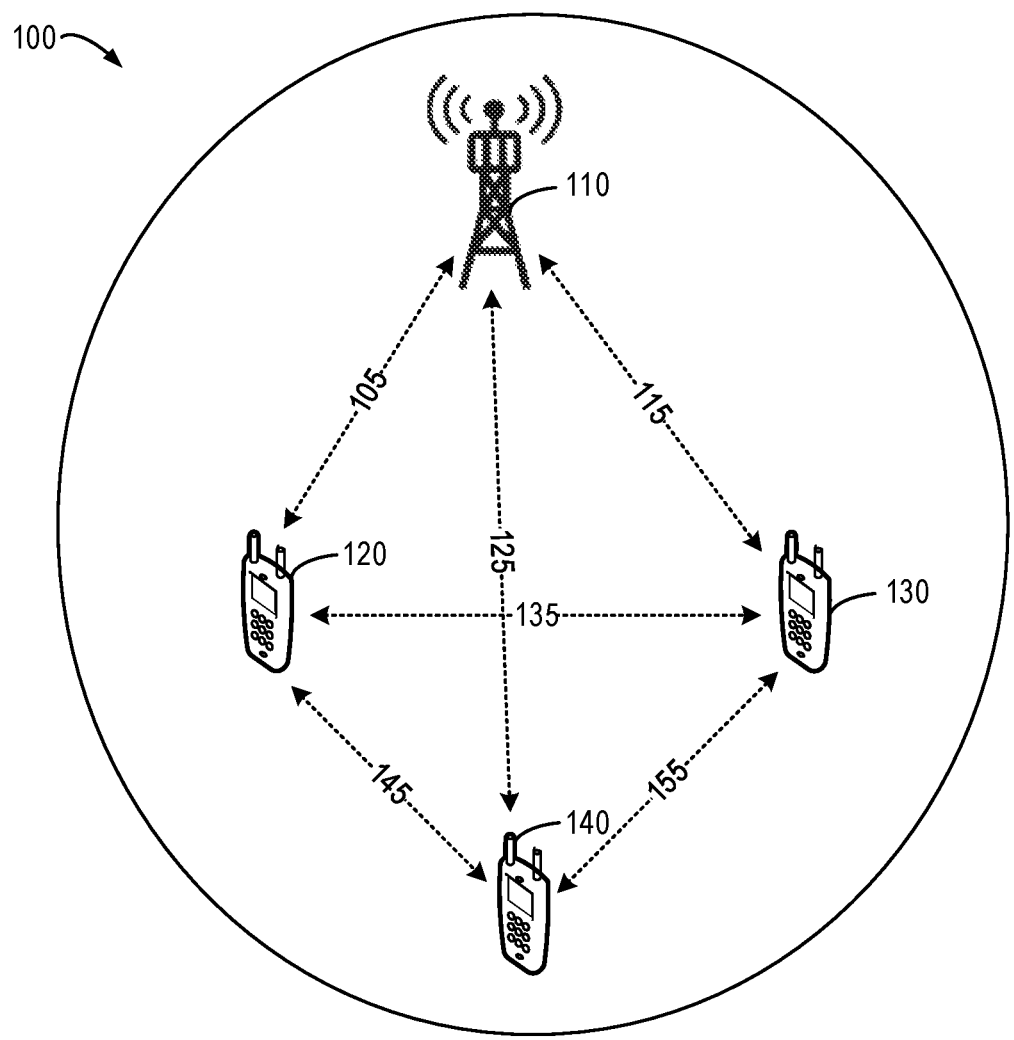
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, some embodiments will be described with reference to UEs as examples of terminal devices and the terms "terminal device" and "user equipment" (UE) may be used interchangeably in the context of the present disclosure.

In one embodiment, a terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is an eNB and the second RAT device is a gNB.

Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. As shown in FIG. 1, the communication environment 100, which may also be referred to as the communication network 100, includes a network device 110 serving a first terminal device 120, a second terminal device 130 and a third terminal device 140. In particular, the first terminal device 120 may communicate with the network device 110 via a communication channel 105, the second terminal device 130 may communicate with the network device 110 via a communication channel 115, and the third terminal device 140 may communicate with the network device 110 via a communication channel 125. For transmissions from the network device 110 to the first terminal device 120, the second terminal device 130 or the third terminal device 140, the communication channel 105, 115 or 125 may be referred to as a downlink channel, whereas for transmissions from the first terminal device 120, the second terminal device 130 or the third terminal device 140 to the network device 110, the communication channel 105, 115 or 125 may alternatively be referred to as an uplink channel.

Additionally, the first terminal device 120 may communicate with the second terminal device 130 via a device-to-device (D2D) channel 135, which may also be referred to as a sidelink channel 135. Analogously, the first terminal device 120 may communicate with the third terminal device 140 via a sidelink channel 145, and the second terminal device 130 may communicate with the third terminal device 140 via a sidelink channel 155. In some cases, the network device 110 may be absent in the communication environment 100. For example, one or more of the first terminal device 120, the second terminal device 130 and the third terminal device 140 may be out of the coverage of the network device 110. In such cases, only sidelink communications exist between the first terminal device 120, the second terminal device 130 and the third terminal device 140 as well as possibly other terminal devices not shown in FIG. 1.

In some embodiments, one or more of the first terminal device 120, the second terminal device 130 and the third terminal device 140 may belong to one group of terminal devices in sidelink groupcast communications as defined in the 3GPP specifications, or belong to different groups of terminal devices, respectively. As an example, the first terminal device 120, the second terminal device 130 and the third terminal device 140 may be in a same group of terminal devices in sidelink groupcast communications. In such case, any one of the first terminal device 120, the second terminal device 130 and the third terminal device 140 can be a head terminal device, and the rest terminal devices in the group other than the head terminal device can be member terminal devices.

As used herein, the head terminal device may be a terminal device in a group of terminal devices in sidelink groupcast communications, which controls or manages the sidelink groupcast communications in the group, and can communicate on behalf of the group with other devices outside the group. In some cases, the first terminal device 120, the second terminal device 130 and the third terminal device 140 may all be member terminal devices, and the head terminal device is another terminal device. As another example, one or more of the first terminal device 120, the second terminal device 130 and the third terminal device 140 may belong to different groups of terminal devices in sidelink groupcast communications. For instance, the three terminal devices may belong to three groups of terminal devices, respectively.

Alternatively, the first terminal device 120 and the second terminal device 130 may be in a same group, and the third terminal device 140 may belong to another group. In alternative, the first terminal device 120 and the third terminal device 140 may be in a same group, and the second terminal device 130 may belong to another group. In other instances, the second terminal device 130 and the third terminal device 140 may be in a same group, and the first terminal device 120 may belong to another group. In some embodiments, any one or more of the first terminal device 120, the second terminal device 130 and the third terminal device 140 may not belong to any group of terminal devices in sidelink groupcast communications.

In some embodiments, during a sidelink communication between the first terminal device 120 and the second terminal device 130 via the sidelink channel 135, the first terminal device 120 can perform a sidelink transmission to the second terminal device 130 using a set of transmission resources. As used herein, the term "sidelink transmission" generally refers to any transmission performed from one terminal device to another terminal device via a sidelink channel between them. The sidelink transmission may be used for transmitting any data or control information associated with sidelink communications, for example, sidelink data or sidelink control information or sidelink feedback information. As used herein, the term "sidelink channel" may generally refer to any channels for sidelink communications, for example, Physical Sidelink Shared Channel (PSSCH), Physical Sidelink Control Channel (PSCCH), Physical Sidelink Discovery Channel (PSDCH), Physical Sidelink Broadcast Channel (PSBCH), Physical Sidelink Feedback Channel (PSFCH), and other existing or future sidelink channels.

As used herein, the term "resource," "transmission resource," or "sidelink resource" may refer to any resource for performing a communication, for example, a sidelink communication between terminal devices, such as a resource in time domain (for example, a time slot), a resource in frequency domain (for example, a sub-channel), a resource in space domain, a resource in code domain, or any other resource enabling a communication, and the like. In the following, a resource in both frequency domain and time domain may be used as an example of a sidelink resource for describing some embodiments of the present disclosure. However, it is noted that embodiments of the present disclosure are equally applicable to any other resources in any other domains.

Although the network device 110, the first terminal device 120, the second terminal device 130, and the third terminal device 140 are described in the communication environment 100 of FIG. 1, embodiments of the present disclosure may be equally applicable to any other suitable communication devices in communication with one another. That is, embodiments of the present disclosure are not limited to the example scenario of FIG. 1. In this regard, it is noted that although the first, second and third terminal devices 120, 130 and 140 are schematically depicted as mobile phones in FIG. 1, it is understood that this depiction is only for example without suggesting any limitation. In other embodiments, the first, second and third terminal devices 120, 130 and 140 may be any other wireless communication devices, for example, vehicle-mounted terminal devices.

In case the first, second and third terminal devices 120, 130 and 140 are vehicle-mounted terminal devices, the communications relate to them may be referred to as V2X communications. More generally, although not shown in FIG. 1, a V2X communication related to the first, second and third terminal devices 120, 130 and 140 may comprise a communication between the first, second or third terminal devices 120, 130 or 140 and any other communication device, including but not limited to, an infrastructure device, another vehicle-mounted terminal device, a device of a pedestrian, a roadside unit, or the like. Furthermore, although not shown, all the communication links as shown in FIG. 1 may be via one or more relays.

It is to be understood that the number of the terminal devices and the number of the network devices as shown in FIG. 1 are only for the purpose of illustration without suggesting any limitations. The communication environment 100 may include any suitable number of terminal devices, any suitable number of network devices, and any suitable number of other communication devices adapted for implementing embodiments of the present disclosure. In addition, it would be appreciated that there may be various wireless communications as well as wireline communications (if needed) among all the communication devices.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, sidelink DRX is one of the objectives of 3GPP Release 17 to reduce power consumption for vulnerable road users (VRUs) in V2X use cases and for UEs in public safety and commercial use cases where power consumption in the UEs needs to be minimized. As used herein, vulnerable road users can be defined as those in greater danger than other users, for a variety of reasons. They can include children, disabled people, cyclists and motorcyclists, livestock, pedestrians, elderly persons and learner and newly qualified drivers. However, currently there are still no feasible sidelink DRX communication schemes.

Traditionally, in the Uu interface between a UE and a base station, according to a DRX cycle of a DRX configuration for downlink transmissions, the UE can monitor and decode Physical Downlink Control Channel (PDCCH) during an on-duration period of the DRX cycle and may get into sleep mode during off-duration period of the DRX cycle. More specifically, a UE in a connected mode (such as, RRC CONNECTED state) may monitor the PDCCH to get a downlink transmission grant for the UE to receive downlink data on the Physical Downlink Shared Channel (PDSCH). A DRX procedure in the connected state is introduced in LTE/LTE-A standards to achieve UE power savings. A DRX cycle consists of an "On Duration" and a "DRX period." During the "On Duration," a UE monitors the PDCCH for a grant. Whenever a grant is received, the UE may start an "Inactive Timer." The UE keeps monitoring the PDCCH until the Inactive Timer expires or is stopped by a media access control (MAC) command. Then the UE is in the DRX period, during which the UE can go into a sleep mode to save power.

However, if the traditional DRX configuration for downlink transmissions is used to sidelink communications, different UEs may have different wake-up duration periods and sleep duration periods following the current DRX schemes in the gNB/eNB Uu interface. Accordingly, UEs cannot communicate with each other efficiently via sidelink communications based on legacy DRX schemes in the LTE/NR Uu interface.

In order to solve the above technical problems and potentially other technical problems in conventional solutions, embodiments of the present disclosure provide a solution for sidelink DRX operations in sidelink communications. In some embodiments, a network device can configure or pre-configure a global (also referred to as broad common) sidelink DRX configuration of wake-up duration and sleep duration for related UEs, for example, with different delays of sidelink transmissions for different UEs. Therefore, UEs can communicate with each other via sidelink channels more efficiently, for example, with less half-duplex and resource collision issues. In some embodiments, in a group of UEs in sidelink groupcast communications, a head UE may configure a group (or group common) sidelink DRX configuration of wake-up duration and sleep duration for member UEs. As such, UEs in sidelink groupcast communications can communicate with each other via sidelink channels more efficiently.

In some embodiments, both the global sidelink DRX configuration and the group sidelink DRX configuration may be enabled for a UE. In some embodiments, a Hybrid Automatic Repeat reQuest (HARQ) Round Trip Time (RTT) timer and a retransmission timer for sidelink DRX operations are defined to handle HARQ retransmission issues in sidelink communications. In some embodiments, a specific UE behavior when an Inactivity Timer for sidelink DRX operations is interrupted by a sidelink transmission. Therefore, with the embodiments of the present disclosure, terminal devices can efficiently communicate with each other using sidelink DRX operations. Principles and implementations of the present disclosure will be described in detail below with reference to the figures.

Figure 2:
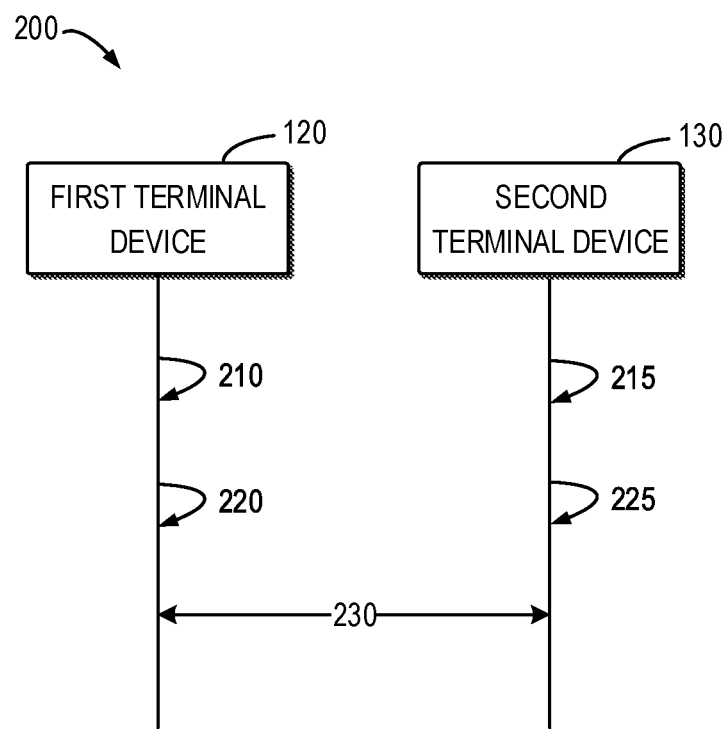
FIG. 2 shows an example communication process between a first terminal device and a second terminal device in accordance with some embodiments of the present disclosure.

FIG. 2 shows an example communication process 200 between the first terminal device 120 and the second terminal device 130 in accordance with some embodiments of the present disclosure. For the purpose of discussion, the communication process 200 will be described with reference to FIG. 1. However, it would be appreciated that the communication process 200 may be equally applicable to other communication scenarios where two terminal devices communicate with each other via a sidelink channel.

As shown in FIG. 2, the first terminal device 120 obtains 210 a sidelink DRX configuration, for example, for the first terminal device 120 to perform sidelink communications with other terminal devices in the communication network 100. In the following, the sidelink DRX configuration for the first terminal device 120 may also be referred to as a first sidelink DRX configuration. As used herein, the sidelink DRX configuration may indicate a set of parameters for the first terminal device 120 to perform sidelink DRX operations. For example, these parameters for the sidelink DRX function may be similar to the parameters for DRX operations in downlink communications between a network device and a terminal device as specified in 3GPP specifications. More generally, the sidelink DRX configuration may refer to any configuration of a terminal device for a DRX function in sidelink communications.

In general, the first terminal device 120 can obtain 210 the sidelink DRX configuration in any one of various suitable manners. For example, the first terminal device 120 may determine the sidelink DRX configuration based on a predefined configuration. In other words, the sidelink DRX configuration is preconfigured for the first terminal device 120. In this way, there is no need for the network device 110 or other control devices to transmit control signals for informing the first terminal device 120 of the sidelink DRX configuration, thereby reducing the signaling overhead.

As another example, the first terminal device 120 may report a recommended sidelink DRX configuration to the network device 110, which can then determine whether the recommended sidelink DRX configuration can be applied to the first terminal device 120. In other embodiments, the first terminal device 120 may report more than one recommended sidelink DRX configurations to the network device 110, and which can then select one of these recommended sidelink DRX configurations to apply to the first terminal device 120. In some cases, the network device 110 may select none of the recommended sidelink DRX configurations and can configure the first terminal device 120 with a sidelink DRX configuration which is considered by the network device 110 to be suitable for the first terminal device 120. In some embodiments, the report of the one or more recommended sidelink DRX configurations from the first terminal device 120 to the network device 110 can be triggered based on an indication from the network device 110, which indication can inform the first terminal device 120 of sending the report to the network device 110. Alternatively or additionally, the report from the first terminal device 120 to the network device 110 may be triggered based on one or more predefined criteria.

Alternatively or additionally, the first terminal device 120 may receive the sidelink DRX configuration from the network device 110, for example, via a radio resource control (RRC) signal. In this way, the network device 110 can configure different sidelink DRX configurations for different terminal devices, and one terminal device may be configured with different sidelink DRX configurations in different communication networks, thereby improving the effectiveness and flexibility of the sidelink DRX configuration. An example in which the first terminal device 120 receives the sidelink DRX configuration from the network device 110 will be described in more detail later with reference to FIG. 4.

In a similar way, the second terminal device 130 can obtain 215 a second sidelink DRX configuration for the second terminal device 130 to perform sidelink communications with other terminal devices in the communication network 100. In some embodiments, the second sidelink DRX configuration for the second terminal device 130 may be the same as the first sidelink DRX configuration for the first terminal device 120. In other words, one sidelink DRX configuration can be applied to both the first terminal device 120 and the second terminal device 130. More generally, in some embodiments, one sidelink DRX configuration may be configured for all the terminal devices in the communication network 100. In this event, the sidelink DRX configuration may also be referred to as a global (or broad common) sidelink DRX configuration, which may be broadcast by the network device 110 to all the terminal devices.

In some other embodiments, the first terminal device 120 and the second terminal device 130 can have respective device-specific sidelink DRX configurations. In other words, the second sidelink DRX configuration may be different from the first sidelink DRX configuration, and can be transmitted individually to the first terminal device 120 and the second terminal device 130 in unicast communications. In this event, although the first and second sidelink DRX configurations are different, a value of a parameter indicated in the first sidelink DRX configuration may be the same as that indicated in the second sidelink DRX configuration. For example, such a parameter may be common to all the terminal devices in the communication network 100, such as, a sidelink DRX cycle. On the other hand, the first sidelink DRX configuration can indicate a first value of a further parameter, and the second sidelink DRX configuration can indicate a different second value of the further parameter. That is, the values of the further parameter may be different for the first terminal device 120 and the second terminal device 130. For example, one or more of various timers for performing sidelink DRX operations may have different values for different terminal devices.

As an example of a parameter common to both the first terminal device 120 and the second terminal device 130, a same sidelink DRX cycle for the two terminal devices can be obtained from a same sidelink DRX configuration common to the two terminal devices or from their respective first and second sidelink DRX configurations. Such a sidelink DRX cycle common to the two terminal devices is described below with reference to FIG. 3.

Figure 3:
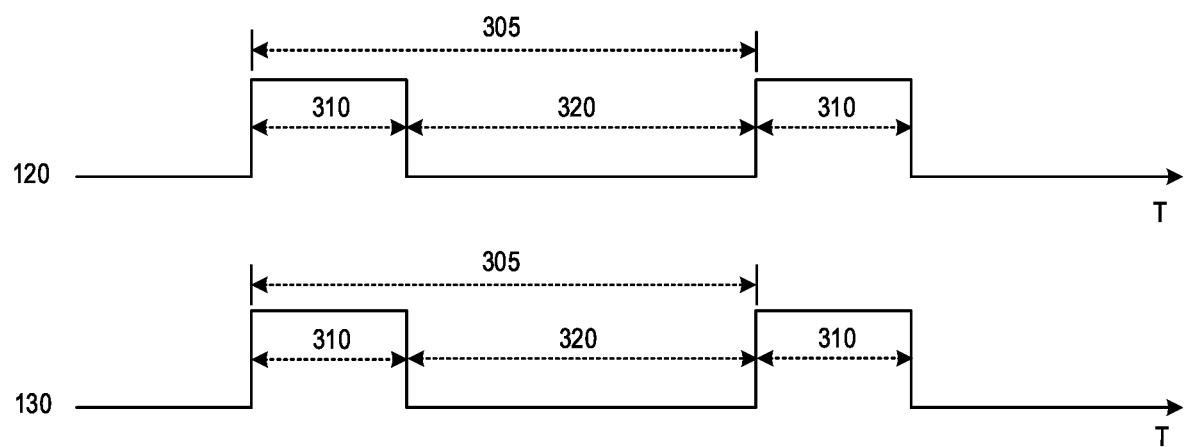
FIG. 3 shows an example of a sidelink DRX cycle including a first duration and a second duration in accordance with some embodiments of the present disclosure.

FIG. 3 shows an example of a sidelink DRX cycle 305 including a first duration 310 and a second duration 320 in accordance with some embodiments of the present disclosure. As shown in FIG. 3, the first terminal device 120 may be configured with the sidelink DRX cycle 305 including the first duration 310 and the second duration 320. During the first duration 310, sidelink communications are allowed to be performed among the terminal devices in the communication network 100, whereas during the second duration 320, the sidelink communications are not allowed to be performed among the terminal devices in the communication network 100. In other words, for sidelink communications, the first terminal device 120 and other terminal devices may be in a wake-up mode during the first duration 310, and may be in a sleep mode during the second duration 320 for saving power.

In some embodiments, the first duration 310 and the second duration 320 can be defined as a number (for example, 1, 2, ..., 10, ..., 100, ..., 1000, or other suitable numbers) of sidelink slots. As used herein, a sidelink slot may generally refer to a time slot designed for sidelink communications, for example, a time slot within a resource pool for sidelink transmissions. In particular, a sidelink slot may consist of fourteen (14) symbols as defined in the 3GPP specifications. However, it should be understood that embodiments of the present application can apply to any currently defined sidelink slots or any sidelink slots to be defined in the future.

As depicted in FIG. 3, the sidelink DRX cycle 305 can occur periodically or repeatedly in time domain (T). In other words, an ending time point of the second duration 320 of a preceding sidelink DRX cycle 305 may be a stating time point of the first duration 310 of a following sidelink DRX cycle 305. That is, the first terminal device 120 may be alternately in the wake-up mode and the sleep mode over time. Likewise, the second terminal device 130 may be configured with a same sidelink DRX cycle 305 including a same first duration 310 and a same second duration 320, and thus may be alternately in the wake-up mode and the sleep mode over time. More generally, all the related terminal devices in the communication network 100 may be configured or preconfigured with a broad common sidelink DRX configuration indicating a uniform wake-up time duration and a uniform sleep time duration.

With reference to FIGS. 2 and 3, the first terminal device 120 determines 220 the sidelink DRX cycle 305 from the first sidelink DRX configuration for the first terminal device 120. After determining 220 the sidelink DRX cycle 305, the first terminal device 120 may know when a sidelink communication can be performed with the second terminal device 130 or other terminal devices and when such a sidelink communication cannot be performed. In a same way, the second terminal device 130 determines 225 the sidelink DRX cycle 305 from the second sidelink DRX configuration for the second terminal device 130. According to the sidelink DRX cycle 305, the second terminal device 130 may also know when a sidelink communication can be performed with the first terminal device 120 or other terminal devices and when such a sidelink communication cannot be performed.

After determining 220 the sidelink DRX cycle 305, the first terminal device 120 performs 230 a sidelink communication with the second terminal device 130 during the first duration 310 of the sidelink DRX cycle 305. For example, the first terminal device 120 can transmit a physical sidelink control channel (PSCCH), a physical sidelink shared channel (PSSCH) or any other sidelink channels to the second terminal device 130 during the first duration 310. As another example, the first terminal device 120 may receive a PSCCH, PSSCH or any other sidelink channels from the second terminal device 130 during the first duration 310. Therefore, from both a receiving UE's perspective and a transmitting UE's perspective, UE's receiving and transmitting of a PSCCH/PSSCH can only occur during a wake-up duration (for example, the first duration 310) determined from the global sidelink DRX configuration and the UEs can enter into a sleep mode during a sleep duration (for example, the second duration 320).

With the communication process 200 of FIG. 2, the first terminal device 120 and the second terminal device 130 as well as other terminal devices can perform sidelink communicates with each other using sidelink DRX operations, that is, terminal devices can efficiently communicate with each other using sidelink DRX operations.

In some embodiments, the first sidelink DRX configuration for the first terminal device 120 and/or the second sidelink DRX configuration for the second terminal device 130 can be enabled or disabled by the network device 110. More generally, the network device 110 can enable or disable a sidelink DRX configuration for any terminal device. For example, the network device 110 can transmit an indication to the first terminal device 120, such as via RRC signaling. The indication can inform the first terminal device 120 of whether the first sidelink DRX configuration is enabled or disabled. For example, the indication can have a false value representing "disabled" and a true value representing "enabled," and vice versa.

Accordingly, the first terminal device 120 can receive the indication from the network device 110 and determine whether the first sidelink DRX configuration is enabled or disabled based on the indication. In this way, the applying of a sidelink DRX configuration to a terminal device can determined by the network device 110 based on the nature or communication scenario of the terminal device, thereby improving the flexibility and effectiveness of the sidelink DRX configuration. For example, if the first terminal device 120 is a vehicle-mounted device which may not need to save power, the sidelink DRX configuration may be disabled for the first terminal device 120.

As mentioned above in describing the communication process 200 with reference to FIG. 2, for obtaining the sidelink DRX configuration, the first terminal device 120 may receive the sidelink DRX configuration from the network device 110. This will be detailed with reference to FIG. 4, which shows an example communication process 400 between the network device 110 and the first terminal device 120 in accordance with some embodiments of the present disclosure. For the purpose of discussion, the communication process 400 will be described with reference to FIG. 1. However, it would be appreciated that the communication process 400 may be equally applicable to other communication scenarios where a terminal device and a network device communicate with each other via uplink/downlink channels.

Figure 4:
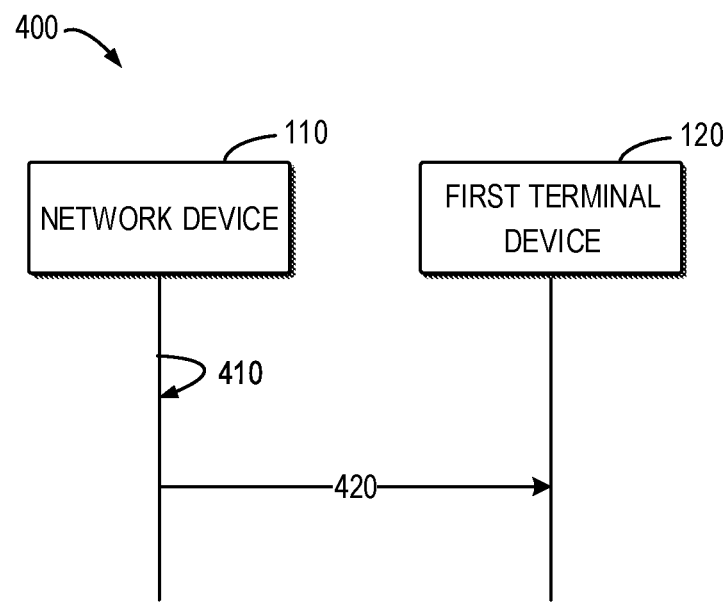
FIG. 4 shows an example communication process between a network device and a first terminal device in accordance with some embodiments of the present disclosure.

As shown in FIG. 4, the network device 110 may determine 410 the sidelink DRX configuration indicating the sidelink DRX cycle 305 including the first duration 310 and the second duration 320. For example, the network device 110 may determine a global sidelink DRX configuration to be used by all the terminal devices in the communication network 100. Alternatively, the network device 110 may determine a device-specific sidelink DRX configuration for each terminal device in the communication network 100. For example, the network device 110 can determine the first sidelink DRX configuration for the first terminal device 120, and the second sidelink DRX configuration for the second terminal device 130, and so on.

In some embodiments, the network device 110 may determine 410 the sidelink DRX configuration based on any one or more of various possible factors, for example, an estimated amount of sidelink communications to be performed in the communication network 100, the natures of individual terminal devices, the specific communication scenarios of individual terminal devices, or the like.

After determining 410 the sidelink DRX configuration, the network device 110 can transmit 420 the sidelink DRX configuration to the first terminal device 120, and thus the first terminal device 120 may receive 420 the sidelink DRX configuration from the network device 110, such that the first terminal device 120 can perform 230 a sidelink communication with the second terminal device 130 based on the sidelink DRX configuration.

For example, if the sidelink DRX configuration is global for all the terminal devices in the communication network 100, the network device 110 may broadcast the sidelink DRX configuration to the terminal devices. Alternatively, if the sidelink DRX configuration is specific to the first terminal device 120, the network device 110 can transmit the sidelink DRX configuration in a unicast communication with the first terminal device 120. In other embodiments, a groupcast communication between the network device 110 and a group of terminal devices may also be used to transmit the sidelink DRX configuration.

In some further embodiments, the network device 110 can broadcast a common parameter (such as, the global sidelink DRX cycle) of the sidelink DRX configurations for different terminal devices. In addition, the network device 110 can unicast the device-specific parameters (for example, various timers for DRX operations) to individual terminal devices. With the communication process 400 of FIG. 4, the network device 110 can flexibly and individually configure the sidelink DRX configuration for each terminal device, and may select an appropriate manner to send the sidelink DRX configuration to one or more terminal devices.

In some embodiments, in the case that a global sidelink DRX cycle 305 is configured for a plurality of terminal devices in the communication network 100, if these terminal devices determine before a first duration 310 to perform sidelink transmissions, they may need to wait for the starting of the first duration 310 to perform these sidelink transmissions. In this event, if the plurality of terminal devices all perform their sidelink transmissions at the beginning of the first duration 310, they cannot receive sidelink transmissions from other terminal devices due to the half-duplex nature and resource collisions may probably occur among these terminal devices in selecting resources for performing the sidelink transmissions. In order to mitigate or eliminate the issues of severe half-duplex and resource collisions, the plurality of terminal devices may perform their sidelink transmissions with different delays (also referred to as offsets). This is described in detail below with reference to FIG. 5.

Figure 5:
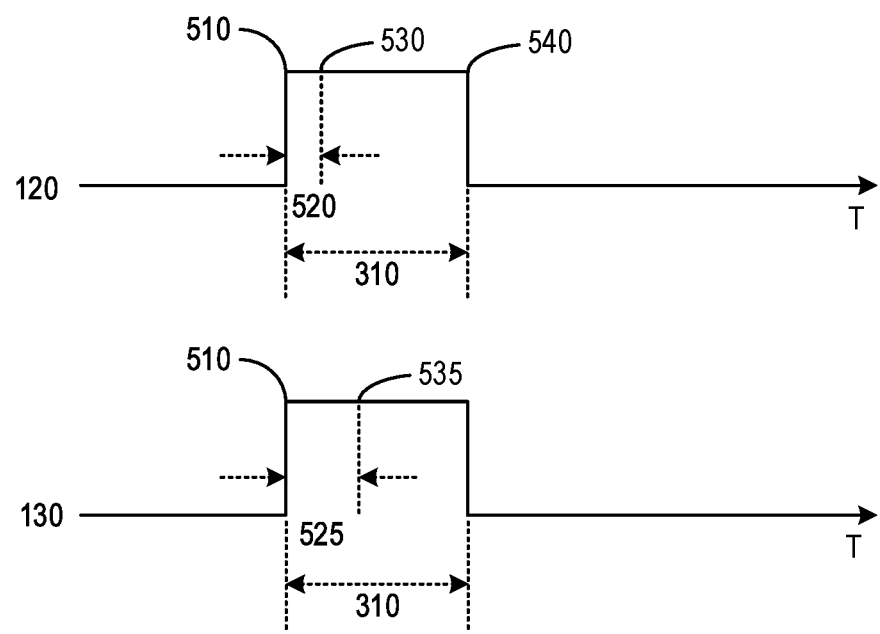
FIG. 5 shows two examples of an offset for performing a sidelink transmission during a first duration of a sidelink DRX cycle in accordance with some embodiments of the present disclosure.

FIG. 5 shows two examples 520 and 535 of the offset for performing a sidelink transmission during the first duration 310 of the sidelink DRX cycle 305 in accordance with some embodiments of the present disclosure. As shown in FIG. 5, during the sidelink communication between the first terminal device 120 and the second terminal device 130, it is assumed that before the beginning of the first duration 310, the first terminal device 120 determines a first sidelink transmission to be performed from the first terminal device 120 to the second terminal device 130 or another terminal device.

Thus, in order to perform the first sidelink transmission, the first terminal device 120 may determine a starting time point 510 of the first duration 310. Also, the first terminal device 120 may determine an offset 520 for performing the first sidelink transmission. Then, the first terminal device 120 can determine a target time point 530 based on the starting time point 510 and the offset 520. Therefore, the first terminal device 120 can perform the first sidelink transmission at the target time point 530. In other words, from a transmitting UE's perspective, at the beginning of wake-up time (such as the first duration 310), for a UE who has sidelink data in a buffer of the UE to transmit, especially for a Mode-2 UE (which selects a transmitting resource by itself), the PSCCH/PSSCH is allowed to be transmitted at least after a delay and may keep receiving status during the duration of the delay.

Similarly, it is assumed that before the beginning of the first duration 310, the second terminal device 130 determines a second sidelink transmission to be performed from the second terminal device 130 to the first terminal device 120 or another terminal device. Accordingly, the second terminal device 130 may determine the starting time point 510 of the first duration 310. Also, the second terminal device 130 may determine an offset 525 for performing the second sidelink transmission, which may be different from the offset 520 for the first terminal device 120. Then, the second terminal device 130 can determine a target time point 535 based on the starting time point 510 and the offset 525. Therefore, the second terminal device 130 can perform the second sidelink transmission at the target time point 535.

It can be seen that since the first terminal device 120 and the second terminal device 130 use different offsets 520 and 525, their sidelink transmissions can be performed at different target time points 530 and 535. In this way, the issues of severe half-duplex and the resource collisions between sidelink transmissions from different terminal devices may be reduced or eliminated. More generally, all the related terminal devices in a communication network can communicate with each other via sidelink channels and can mitigate the issues of severe half-duplex and resource collisions. In some embodiments, the offset (or delay) may be defined as a number (for example, 1, 2, 3, 4, 5, or other suitable numbers) of sidelink slots. In some other embodiments, the offset (or delay) may be defined as a number of millisecond, symbols, or any other time domain units.

In some embodiments, the offset (or delay) may be determined based on one or more of various factors. As an example, the offset can be determined based on a priority of the sidelink transmission to be performed, such as, a priority of the traffic to be transmitted in the buffer of the terminal device. For instance, a higher priority can lead to a smaller offset to ensure that a packet with a higher priority can be transmitted earlier than a packet having a lower priority. Alternatively, a priority lower than a configured or preconfigured threshold "delta priority" may lead to a non-zero offset value, and otherwise the offset may be set to zero. In this way, a sidelink transmission with a higher priority can be performed before a sidelink transmission with a lower priority. In some embodiments, the threshold "delta priority" can be transmitted from a network device to a terminal device via RRC signaling, and it may be one of {1, 2, . . . , 8} in value.

Alternatively or additionally, the offset can be determined based on a latency requirement of the sidelink transmission. More particularly, the offset may be determined by the remaining packet delay budget of the traffic to be transmitted in the buffer of the terminal device. For example, it is assumed that a data packet need to be transmitted from a terminal device to another terminal device in 10 ms, and an initial transmission of the data packet spends 3 ms, which is not successfully received by the receiving terminal device. Then, for the retransmission of the data packet, the remaining packet delay budget may be 10−3=7 ms. In general, a shorter remaining packet delay budget may lead to a smaller offset to ensure that a packet with a shorter remaining packet delay budget can be transmitted earlier. As such, the latency requirement of the sidelink transmission can be satisfied.

Alternatively or additionally, the offset can be determined in a random manner. In other words, the offset may be generated in a randomized way, for example, by a random sequence or associated with an identifier of the source terminal device of the sidelink transmission and/or an identifier of the destination terminal device of the sidelink transmission, so as to improve the fairness among the terminal devices that are to perform sidelink transmissions. Therefore, the half-duplex issues and the resource collisions among the terminal devices can be further reduced. Alternatively or additionally, the offset can be determined based on a predefined value, namely, be preconfigured. In this way, the signaling overhead for the offset can be reduced.

Alternatively or additionally, the offset can be determined based on a value indicated by the network device 110 in the communication network 100. For example, the network device 110 may transmit an indication of the offset to the first terminal device 120, such as, via RRC signaling. The indication may inform the first terminal device 120 of the offset to be used to perform a sidelink transmission to the second terminal device 130 or other terminal devices. As such, the offset can be flexibly configured by the network device 110 for the first terminal device 120.

In some embodiments, when the first terminal device 120 performs a sidelink transmission, a higher layer (for example, a medium access control, MAC, layer) of the first terminal device 120 can first send a trigger to a physical layer of the first terminal device 120 to detect available resources for performing the sidelink transmission. Then, the physical layer can detect the available resources and provide the higher layer with a selection time window for selecting a resource from the available resources. Afterwards, the higher layer can select the resource for performing the sidelink transmission based on the selection time window, and indicate the physical layer to perform the sidelink transmission using the selected resource.

In such embodiments, the offset (or delay) for performing a sidelink transmission can be implemented in one of various ways. For example, in order to perform the sidelink transmission at the target time point 530, the first terminal device 120 may cause a transmission of the above-mentioned trigger from the higher layer to the physical layer to start after the offset 520. That is, from a transmitting UE's perspective, the intended timing to trigger resource sensing and selection from the higher layer to the lower layer (such as, the physical layer) may be delayed by the offset.

As another example, the first terminal device 120 may cause the transmission of the trigger without the offset 520, and cause the physical layer to detect the available resources after the offset 520. That is, from a transmitting UE's perspective, in the physical layer, upon receiving the trigger of resource sensing and selection from the higher layer, the physical layer delays the offset 520 to perform the resource sensing and selection procedure.

As a further example, the first terminal device 120 may cause the transmission of the trigger without the offset 520, cause the physical layer to detect the available resources without the offset 520, and cause the aforementioned selection time window to start after the offset 520. In other words, from a transmitting UE's perspective, the beginning of the resource selection window can be delayed by the offset 520. In this event, an ending time point of the resource selection window may be delayed by the offset 520 accordingly, or alternatively may not be delayed. For example, it is assumed that the physical layer receives the trigger from the higher layer at slot n, and the resource selection window may be from slot n+1 to slot n+100 without an offset. Then, with an offset of 4 slots, the resource selection window can be changed to be from slot n+5 to slot n+100 or from slot n+5 to slot n+104. Through the above various manners, the offset in transmitting a sidelink transmission can be achieved and ensured.

In some embodiments, with reference to FIG. 5, if the target time point 530 is later than an ending time point 540 of the first duration 310, or if the target time point 530 is unable to meet a latency requirement of the sidelink transmission to be performed, the first terminal device 120 can set the offset 520 to be a predetermined value, for example, a minimum value or zero. In this way, it is ensured that the sidelink transmission is not negatively impacted by the offset 520.

Moreover, from a transmitting UE's perspective, the delay behavior in performing a sidelink transmission can be disabled or enabled by a configuration from the higher layer or by a pre-configuration. For example, the network device 110 may transmit an indication to the first terminal device 120, which indication can indicate whether the offset is enabled or disabled. Thus, the first terminal device 120 can receive the indication from the network device 110, and then enable or disable the offset when performing sidelink transmissions, based on the indication. As such, the network device 110 can flexibly and individually enable or disable the offset for each terminal device.

As described above, in some embodiments, one or more of the first terminal device 120, the second terminal device 130, and the third terminal device 140 can be in a group of terminal devices in sidelink groupcast communications. In such a group of terminal devices, a head terminal device can configure a group (also termed as group common) sidelink DRX configuration for member terminal devices, for example, via RRC signaling or a MAC control element (CE). Similar to the global sidelink DRX configuration, the group sidelink DRX configuration can indicate a set of parameters for a terminal device in a group of terminal devices in sidelink groupcast communications to perform sidelink DRX operations in the group. For example, the group sidelink DRX configuration may indicate a third duration (a wake-up duration) and a fourth duration (a sleep duration), which may also be defined as a number (for example, 1, 2, . . . , 10, . . . , 100, . . . , 1000, or other suitable numbers) of sidelink slots, but may be different from the first duration and the second duration as indicated in the global sidelink DRX configuration.

Figure 6:
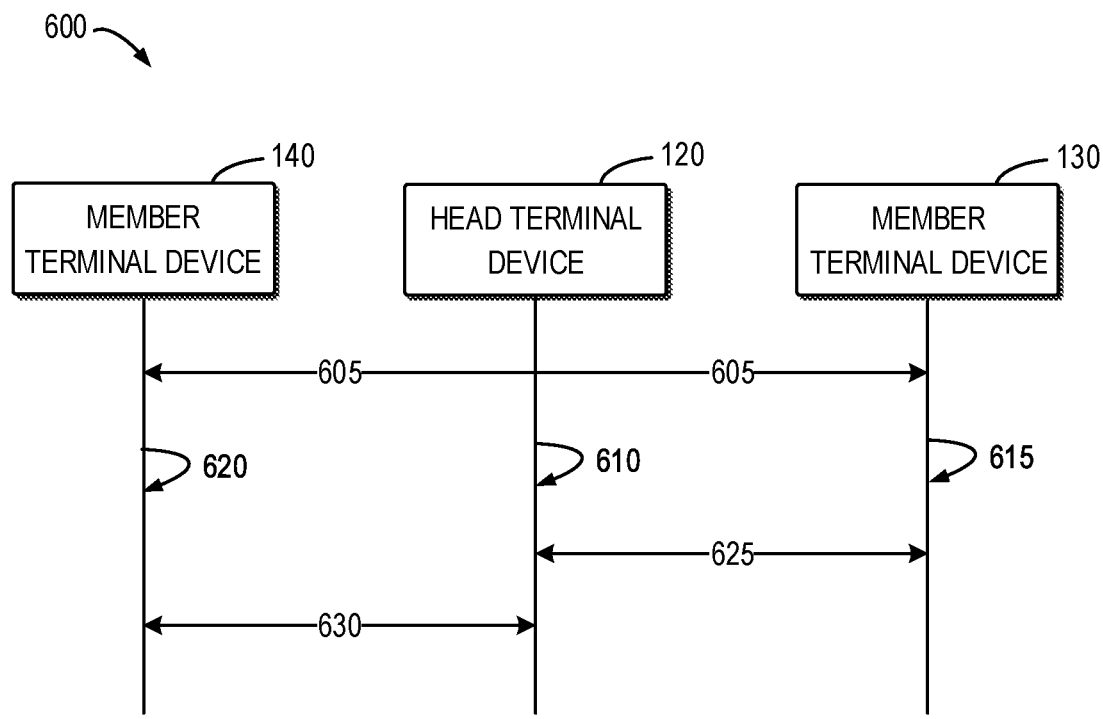
FIG. 6 shows an example communication process between a head terminal device and member terminal devices in accordance with some embodiments of the present disclosure.

FIG. 6 shows an example communication process 600 between a head terminal device 120 and member terminal devices 130 and 140 in accordance with some embodiments of the present disclosure. In the example of FIG. 6, it is assumed that the first terminal device 120, the second terminal device 130, and the third terminal device 140 are in a same group of terminal devices in sidelink groupcast communications. It is also assumed that the first terminal device 120 is the head terminal device in the group of terminal devices, and the second terminal device 130 and the third terminal device 140 are member terminal devices in the group of terminal devices.

However, it is understood that the case as depicted in FIG. 6 is only for example, without suggesting any limitation. In other embodiments, the first terminal device 120 may be a member terminal device in the group, and the second terminal device 130 or the third terminal device 140 can be the head terminal device in the group. Therefore, the operations as described being performed by the second terminal device 130 or the third terminal device 140 can also be performed by the first terminal device 120, and vice versa.

As shown in FIG. 6, the head terminal device 120 can transmit 605 the group sidelink DRX configuration to the member terminal devices 130 and 140. Accordingly, the member terminal devices 130 and 140 may receive 605 the group sidelink DRX configuration from the head terminal device 120. In some embodiments, the head terminal device 120 may broadcast the group sidelink DRX configuration to all the member terminal devices in the group, for example, the group sidelink DRX configuration including parameters (such as, a group sidelink DRX cycle) common to all the member terminal devices. In some other embodiments, the head terminal device 120 may unicast different values of a device-specific parameter (for example, various timers for group sidelink DRX operations) to individual member terminal devices.

The head terminal device 120 may determine 610 a group sidelink DRX cycle from the group sidelink DRX configuration. Also, the member terminal device 130 may determine 615 the group sidelink DRX cycle from the group sidelink DRX configuration, and the member terminal device 140 may determine 620 the group sidelink DRX cycle from the group sidelink DRX configuration. The group sidelink DRX cycle may include a third duration and a fourth duration. The head terminal device 120 is allowed to perform sidelink transmissions to the member terminal devices 130 and 140 and other member terminal devices during the third duration, and is allowed to receive sidelink transmissions from the member terminal devices 130 and 140 and other member terminal devices during the third and fourth durations. That is, from the head (transmitting) terminal device's perspective, a configuration of a wake-up duration and a sleep duration can be conveyed to one or multiple member UEs via higher layer signaling, for example, PC5 RRC signaling or a MAC CE. Then the head UE can only transmit PSCCHs/PSSCHs to these configured member UEs during the wake-up duration and can receive PSCCHs/PSSCHs from the member UEs both during the wake-up duration and the sleep duration.

On the other hand, the member terminal devices 130 and 140 and other member terminal devices may monitor sidelink transmissions from the head terminal device 120 during the third duration. That is, form a member (receiving) terminal device's perspective, a configuration of a wake-up duration and a sleep duration may be obtained from the head UE via higher layer signaling, for example, PC5 RRC signaling or a MAC CE. Then the member UEs just need to monitor and decode PSCCH/PSSCHs from the head UE during the wake-up duration, while can transmit PSCCH/PSSCHs to the head UE during both the configured wake-up duration and the sleep duration.

After the head terminal device 120 determines 610 the group sidelink DRX cycle, and the member terminal device 130 determines 615 the group sidelink DRX cycle, and the member terminal device 140 determines 620 the group sidelink DRX cycle, the head terminal device 120 may perform 625 sidelink communications with the member terminal device 130 based on the group sidelink DRX cycle, and the head terminal device 120 may perform 630 sidelink communications with the member terminal device 140 based on the group sidelink DRX cycle.

With the communication process 600 of FIG. 6, the group sidelink DRX configuration transmitted from the head UE to one or more member UEs in some cases can make sidelink communications more efficient. In addition, it should be noted that the group sidelink DRX configuration may be configured for terminal devices in addition to or instead of the global sidelink DRX configuration. In other words, in some embodiments, a terminal device may be configured with both the global sidelink DRX configuration and the group sidelink DRX configuration. In some other embodiments, a terminal device may be configured with only one of the global sidelink DRX configuration and the group sidelink DRX configuration.

In some embodiments, the group sidelink DRX configuration may be transmitted using a higher layer signal or a MAC CE. In this way, the head terminal device 120 can use existing signaling to inform the member terminal devices of the group sidelink DRX configuration, and thus there is no need to design new signaling for transmitting the group sidelink DRX configuration.

Additionally or alternatively, the group sidelink DRX configuration may be transmitted using a periodical manner with a predefined period. That is, the signaling of the group sidelink DRX configuration from the head UE to member UEs may appear periodically with the predefined period. In some embodiments, the predefined period can be preconfigured or signaled via RRC signaling, and may be a number (for example, 5, 10, 20, or other suitable numbers) of sidelink slots, a number of seconds, a number of milliseconds, or the like. As such, the group sidelink DRX configuration can be updated over time and terminal devices newly joining the group can also receive the group sidelink DRX configuration.

In some embodiments, if a duration for which a member terminal device does not receive the group sidelink DRX configuration from the head terminal device exceeds the predefined period, the member terminal device may determine that the group sidelink DRX configuration is disabled. In other words, if a UE does not receive the configuration of the wake-up duration and the sleep duration from any head UE for a time counter longer than the predefined period, the group sidelink DRX configuration can be disabled and the global sidelink DRX configuration may be used. In this way, the group sidelink DRX configuration can be implicitly disabled for reducing the signaling overhead.

In the example of FIG. 6, the member terminal devices 130 and 140 receive the group sidelink DRX configuration from the head terminal device 120. In this way, the head terminal device 120 can configure a suitable group sidelink DRX configuration for the group based on the current communication requirement or situation, and can update the group sidelink DRX configuration over time. However, it should be noted that the member terminal devices 130 and 140 can obtain the group sidelink DRX configuration in any other suitable manner, for example, the group sidelink DRX configuration can be determined by the member terminal devices based on a predefined configuration. In this way, the head terminal device 120 has no need to transmit the group sidelink DRX configuration to the member terminal devices 130 and 140 as well as other member terminal devices, thereby reducing the signaling overhead.

As another example, a member terminal device may report a recommended group sidelink DRX configuration to the head terminal device 120, which can then determine whether the recommended group sidelink DRX configuration can be applied to the member terminal device. In other embodiments, the member terminal device may report more than one recommended group sidelink DRX configurations to the head terminal device 120, and which can then select one of these recommended group sidelink DRX configurations to apply to the member terminal device. In some cases, the head terminal device 120 may select none of the recommended group sidelink DRX configurations and can configure the member terminal device with a group sidelink DRX configuration which is considered by the head terminal device 120 to be suitable for the member terminal device or suitable for the group.

In some embodiments, the report of the one or more recommended group sidelink DRX configurations from the member terminal device to the head terminal device 120 can be triggered based on an indication from the head terminal device 120, which indication can inform the member terminal device of sending the report to the head terminal device 120. Alternatively or additionally, the report from the member terminal device to the head terminal device 120 may be triggered based on one or more predefined criteria. In addition, it is noted that the afore-mentioned scenario of sidelink groupcast communications may turn into sidelink unicast communications when the size of the group of terminal devices is two including the head UE.

In some embodiments, the group sidelink DRX configuration for the member terminal device 130 can be enabled or disabled by the head terminal device 120. In general, the head terminal device 120 can enable or disable the group sidelink DRX configuration for any member terminal device. In particular, the head terminal device 120 can transmit an indication to the member terminal device 130, for example, the indication may be via RRC signaling. The indication can inform the member terminal device 130 of whether the group sidelink DRX configuration is enabled or disabled. For example, the indication can have a false value representing "disabled" and a true value representing "enabled," and vice versa.

Therefore, the member terminal device 130 can receive the indication from the head terminal device 120 and determine whether the group sidelink DRX configuration is enabled or disabled based on the indication. In this way, the applying of the group sidelink DRX configuration to the member terminal device 130 can depend on the nature or current communication situation of the member terminal device 130, thereby improving the flexibility of the group sidelink DRX configuration.

In some embodiments, if there is no sidelink transmission to be performed to a target member terminal device of the member terminal devices during the third duration, the head terminal device 120 may transmit an indication to the target member terminal device 130, for example, via RRC signaling or a MAC CE. The indication may inform the target member terminal device of entering into a power saving mode. Upon receiving the indication from the head terminal device 120 during the third duration (wake-up duration) of the group sidelink DRX cycle, the member terminal device 130 may enter into the power saving mode, in which the head terminal device 120 is not to perform sidelink transmissions to the member terminal device 130. In this way, the target member terminal device can save more power.

Figure 7:
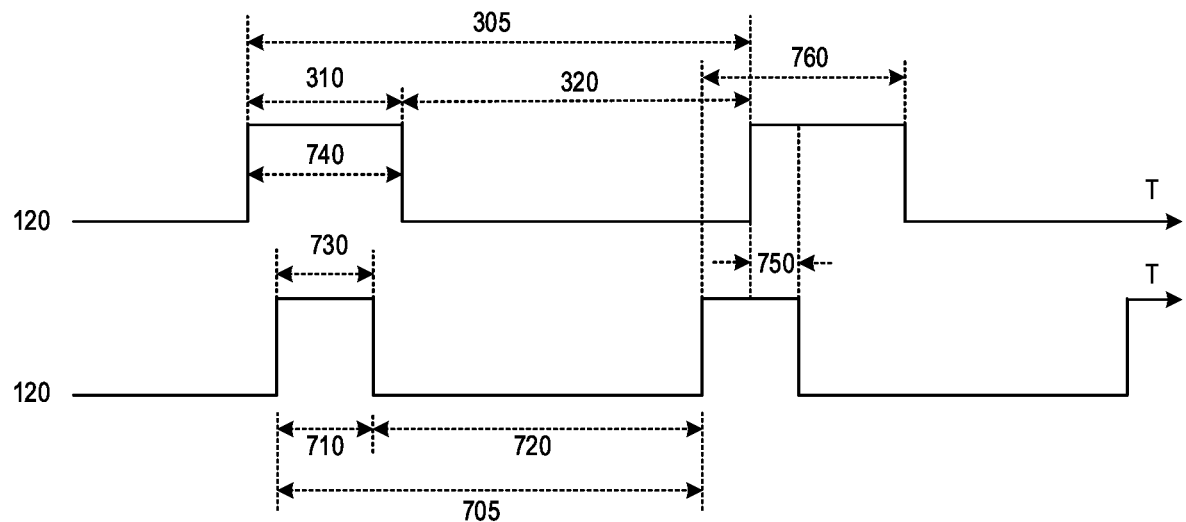
FIG. 7 shows two examples of a transmitting duration and two examples of a receiving duration in case both a global sidelink DRX cycle and a group sidelink DRX cycle are configured for a first terminal device in accordance with some embodiments of the present disclosure.

FIG. 7 shows two examples 740 and 750 of a transmitting duration and two examples 740 and 760 of a receiving duration in case both a global sidelink DRX cycle 305 and a group sidelink DRX cycle 705 are configured for the first terminal device 120 in accordance with some embodiments of the present disclosure. As shown in FIG. 7, it is assumed that the first terminal device 120 is configured with the global sidelink DRX cycle 305 including the first duration 310 and the second duration 320. The first terminal device 120 can use the global sidelink DRX cycle 305 for performing sidelink communications with other terminal devices in the communication network 100. It is further assumed that the first terminal device 120 is also configured with a group sidelink DRX cycle 705 including a third duration 710 and a fourth duration 720. The first terminal device 120 can use the group sidelink DRX cycle 705 for performing sidelink communications with other terminal devices in a same group of terminal devices in sidelink groupcast communications.

It can be seen that the global sidelink DRX cycle 305 and the group sidelink DRX cycle 705 may have different time lengths. For example, the first duration 310 and the third duration 710 may be different in the time length, and the second duration 320 and the fourth duration 720 may also be different in the time length. In addition, other terminal devices in the communication network 100 may have various respective group sidelink DRX cycles. For example, if the second terminal device 130 belongs to a different group of terminal devices from the group to which the first terminal device 120 belongs, the second terminal device 130 may be configured with the global sidelink DRX cycle 305 and another group sidelink DRX cycle different from the group sidelink DRX cycle 705. As another example, the third terminal device 140 may only be configured with the global sidelink DRX cycle 305 and does not have a group sidelink DRX cycle, since it does not belong to any group of terminal devices in sidelink groupcast communications.

In such a scenario, the first terminal device 120 can use a uniform transmitting duration and a uniform receiving duration to perform sidelink communications with other terminal devices, regardless of the different group sidelink DRX cycles for the first terminal device 120 and the other terminal devices. There may be two options for the uniform transmitting duration and the uniform receiving duration.

As a first option, irrespective of the group sidelink DRX cycle of the second terminal device 130 or another terminal device, the first terminal device 120 can perform a sidelink transmission to the second terminal device 130 or another terminal device during a common portion (such as, the durations 730 and 750) of the first duration 310 and the third duration 710, and can receive a sidelink transmission from the second terminal device 130 or another terminal device during both the first and the third durations (such as, the durations 740 and 760). In other words, for the first terminal device 120 as a member terminal device, a sidelink transmission can be performed during the intersection of non-zero wake-up durations of all the sidelink DRX configurations (for example, the global and group sidelink DRX configurations), and a sidelink reception may be performed during the union of the wake-up durations of all the sidelink DRX configurations (for example, the global and group sidelink DRX configurations). In this way, the reliability of sidelink transmissions can be improved, since the sidelink transmissions are performed in a smaller time range, whereas the sidelink receptions are performed in a larger time range.

As a second option, irrespective of the group sidelink DRX cycle of the second terminal device 130 or another terminal device, the first terminal device 120 can perform a sidelink transmission to the second terminal device 130 or another terminal device during the first duration 305, and receive a sidelink transmission from the second terminal device 130 or another terminal device during both the first and the third durations (such as, the durations 740 and 760). In other words, for the first terminal device 120 as a member terminal device, a sidelink transmission can be performed during the wake-up duration from the broad common sidelink DRX configuration, and a sidelink reception may be performed during the union of the wake-up durations of all the sidelink DRX configurations (for example, the global and group sidelink DRX configurations). In this way, the reliability of sidelink transmissions can be improved, since the sidelink transmissions are performed in a smaller time range, whereas the sidelink receptions are performed in a larger time range.

With the uniform transmitting duration and the uniform receiving duration, the reliability of sidelink communications among UEs with different sidelink DRX configurations can be improved. It should be noted that in both the first and second options, the second terminal device 130 can be the head terminal device in the group of terminal devices to which the first terminal device 120 belongs. That is, the first and second options can also apply to the head terminal device, so that when performing a sidelink communication, the first terminal device 120 needs not to distinguish between the head terminal device and other terminal devices. Alternatively, the first terminal device 120 may use the first or second option to perform sidelink communications with terminal devices other than the head terminal device, and use the group sidelink DRX cycle 705 to perform sidelink communications with the head terminal device.

In some embodiments, one or more timers may be configured or preconfigured for the first terminal device 120 as well as other terminal devices to perform sidelink DRX operations. Some of these timers will be described below with reference to FIGS. 8 to 10. It should be noted that in some embodiments, these timers can be indicated in the global or group sidelink DRX configuration as described above. However, in some other embodiments, these timers may be predefined or indicated by a network device or a head terminal device in any configuration information other than the described global or group sidelink DRX configuration.

Figure 8:
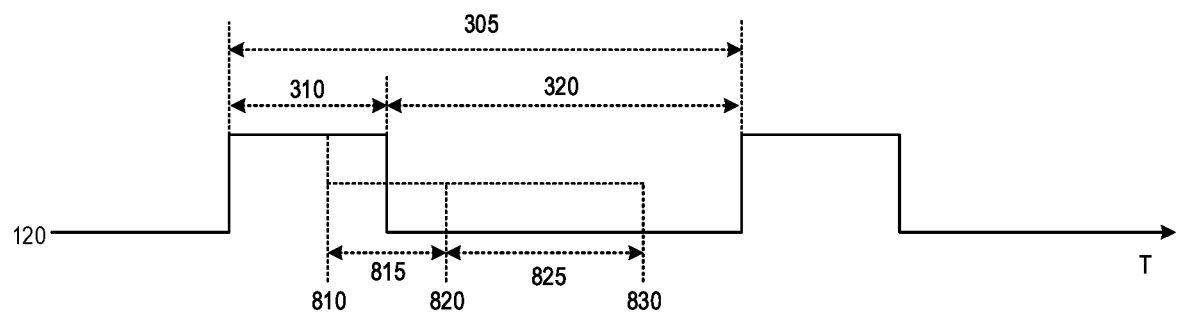
FIG. 8 shows an example of a first timer and an example of a second timer for sidelink DRX operations in accordance with some embodiments of the present disclosure.

FIG. 8 shows an example of a first timer and an example of a second timer for sidelink DRX operations in accordance with some embodiments of the present disclosure. As shown in FIG. 8, the first terminal device 120 performs sidelink DRX operations based on the sidelink DRX cycle 305 including the first duration 310 and the second duration 320. It is assumed that the first terminal device 120 receives a sidelink transmission (for example, a PSCCH) from the second terminal device 130. In addition, it is assumed that the first terminal device 120 unsuccessfully receives the sidelink transmission.

In such a case, the first terminal device 120 can start a first timer at the time point 810 when transmitting a negative feedback for the sidelink communication, when receiving the sidelink transmission, or when unsuccessfully decoding the sidelink transmission. The first timer indicates a first duration 815 from the time point 810 to a time point 820. The first duration 815 may include a first number (for example, 0, 1, 2, 4, 8, or other suitable numbers) of sidelink slots. In some embodiments, the first timer may have a similar function to the "drx-HARQ-RTT-TimerDL" as defined in the 3GPP specifications (for example, 3GPP TS 38.321), and thus can also be referred to as HARQ-RTT-TimerSL herein.

In other words, for HARQ-enabled cases, from a receiving UE's perspective, a HARQ-RTT-TimerSL may be configured or preconfigured for each sidelink HARQ process from the higher layer from a network device or a head UE. The value of the HARQ-RTT-TimerSL may be in number of sidelink slots, and the HARQ-RTT-TimerSL can be started from the associated PSFCH slot, or be started from the receiving time or the failure decode time of the PSCCH/

PSSCH of the BWP where the transport block is received. As used herein, the BWP stands for bandwidth part and refers to a part of the bandwidth of a carrier. In addition, from a receiving UE's perspective, a UE can keep sleep if the data of the corresponding HARQ process was not successfully decoded until HARQ-RTT-TimerSL expires, since the transmitting terminal device needs to prepare the retransmission during the duration 815 of the HARQ-RTT-TimerSL.

In some embodiments, when the first timer expires at the time point 820, the first terminal device 120 can start a second timer indicating a second duration 825 from the time point 820 to a time point 830, before a sidelink retransmission for the sidelink transmission is received by the first terminal device 120. The second duration 825 may include a second number (for example, 0, 1, 2, 4, 8, 16, or other suitable numbers) of sidelink slots. In some embodiments, the second timer may have a similar function to the "drx-RetransmissionTimerDL" as defined in the 3GPP specifications (for example, 3GPP TS 38.321), and thus can also be referred to as RetransmissionTimerSL herein. In some embodiments, during the second duration 825 of the second timer, the first terminal device 120 can only receive the expected sidelink retransmission from the second terminal device 130. Alternatively, the first terminal device 120 may receive both the expected sidelink retransmission and any other sidelink transmissions from the second terminal device 130 and other terminal devices.

In other words, for HARQ-enabled cases, from a perspective of receiving terminal device in a sidelink communication, the RetransmissionTimerSL may be configured or preconfigured for each sidelink HARQ process from the higher layer from a network device or a head UE. The value of the RetransmissionTimerSL may be in number of sidelink slots of the BWP. A UE can start this timer RetransmissionTimerSL after the expiry of the HARQ-RTT-TimerSL and stopped it when a sidelink retransmission of the corresponding HARQ process is received. In some embodiments, since the first terminal device 120 may need to receive the expected sidelink retransmission from the second terminal device 130, the first terminal device 120 can monitor sidelink transmissions from the second terminal device while the second timer is active. That is, from a receiving UE's perspective, a UE can keep awake during the RetransmissionTimerSL timer is active.

In some embodiments, the first timer and the second timer can be indicated in the sidelink DRX configuration transmitted from the network device 110 to the first terminal device 120, for example, via RRC signaling or a MAC CE. Accordingly, the first terminal device 120 may determine the first timer and the second timer from the sidelink DRX configuration. It should be noted that the global sidelink DRX configuration and the group sidelink DRX configuration may have respective first timers, for example, a global-drx-HARQ-RTT-TimerSL and a group-drx-HARQ-RTT-TimerSL, and respective second timers, for example, a global-drx-RetransmissionTimerSL and a group-drx-RetransmissionTimerSL. Thus, the first timer and the second timer for the group sidelink DRX operations may be indicated in the group sidelink DRX configuration transmitted from a head terminal device to a member terminal device, for example, via RRC signaling or a MAC CE. In some embodiments, the first timer and the second timer may be preconfigured for each terminal device.

It is noted that in the traditional schemes, the definition of the "HARQ-RTT-TimerSL" based on "K+4" subframes in LTE is not reasonable for sidelink communications which involve different numerologies. In addition, the definition of the "HARQ-RTT-TimerSL" based on (0 . . . 56) physical symbols in NR is also unreasonable for slot-based scheduling and sidelink slots in sidelink communications. Moreover, the definition of the "RetransmissionTimerSL" in the LTE and NR Uu interface is not reasonable for sidelink slots as used in sidelink communications. The first and second timers as defined in the above embodiments can well solve these issues.

In conventional DRX schemes in downlink communications, a terminal device may be configured with an inactivity timer, for example, the "drx-InactivityTimer" which is defined in the 3GPP specifications as the duration after the PDCCH occasion in which a PDCCH indicates a new UL or DL transmission for the MAC entity. However, when such an inactivity timer for downlink communications is used for sidelink communications, a problem may arise, which will be explained below with reference to FIG. 9.

Figure 9:
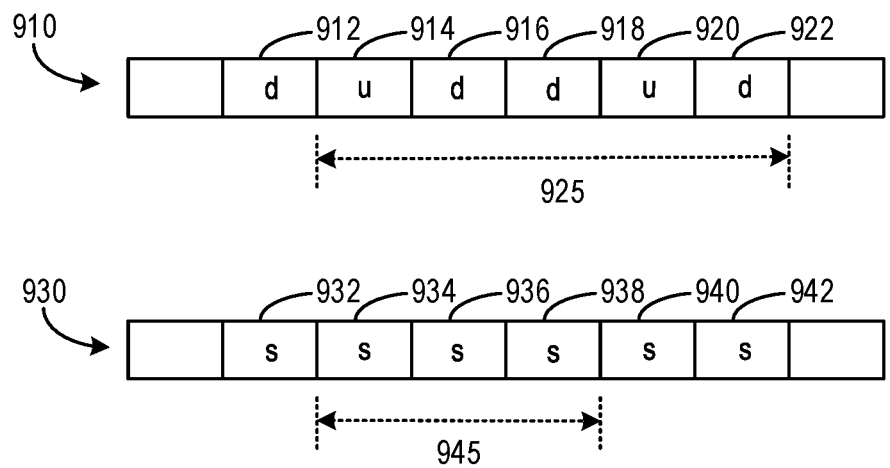
FIG. 9 shows an example for explaining an issue arising when an inactivity timer for DRX operations in downlink transmissions is used in sidelink communications in accordance with some embodiments of the present disclosure.

FIG. 9 shows an example for explaining an issue arising when an inactivity timer for DRX operations in downlink transmissions is used in sidelink communications in accordance with some embodiments of the present disclosure. As shown in FIG. 9, it is assumed that the first terminal device 120 is allocated with an uplink/downlink slot sequence 910 of uplink/downlink slots to perform uplink/downlink communications with the network device 110. The uplink/downlink slot sequence 910 may include a downlink slot 912, an uplink slot 914, a downlink slot 916, a downlink slot 918, an uplink slot 920, a downlink slot 922, and so on. The first terminal device 120 can perform downlink communications with the network device 110 in the downlink slots 912, 916, 918, and 922, and perform uplink communications with the network device 110 in the uplink slots 914 and 920.

In addition, it is assumed that the first terminal device 120 receives a downlink control channel (for example, PDCCH) from the network device 110 in the uplink slot 914. Then, the first terminal device 120 may start an inactivity timer for downlink data transmissions. The inactivity timer can prevent the first terminal device 110 from entering into the sleep mode when the inactivity timer is active. The inactivity timer indicates a duration 925 including a specified number (in this example, three) of downlink slots 916, 918, and 922. As such, the first terminal device 120 may be awake during the duration 925 as indicted by the inactivity timer, and thus can receive downlink data transmissions from the network device 110 during the following three downlink slots 916, 918, and 922. In addition, the first terminal device 120 can normally perform uplink communications with the network device 110 in the uplink slots 914 and 920.

As mentioned, if such a mechanism of the inactivity timer for downlink communications is used to sidelink communications between terminal devices, a problem may occur. As shown in FIG. 9, it is assumed that the first terminal device 120 is allocated with a sidelink slot sequence 930 of sidelink slots to perform sidelink communications with the second terminal device 130. The sidelink slot sequence 930 may include sidelink slots 932 to 942 and so on. The first terminal device 120 can perform sidelink communications with the second terminal device 130 or other terminal devices in the sidelink slots 932 to 942. In particular, in each of the sidelink slots 932 to 942, the first terminal device 120 may perform sidelink transmissions to the second terminal device 130 or other terminal devices, and may alternatively receive sidelink transmissions from the second terminal device 130 or other terminal devices.

It is assumed that the first terminal device 120 receives a sidelink control channel (for example, PSCCH) from the second terminal device 130 in the sidelink slot 934. Then, the first terminal device 120 may start an inactivity timer for sidelink communications (for example, data transmissions). The inactivity timer can prevent the first terminal device 110 from entering into the sleep mode when the inactivity timer is active. The inactivity timer indicates a duration 945 including a specified number (in this example, three) of sidelink slots 934, 936, and 938. As such, the first terminal device 120 may be awake during the duration 945 as indicted by the inactivity timer, and thus can receive sidelink transmissions (for example, data transmissions) from the second terminal device 130 during the following three sidelink slots 934, 936, and 938.

However, if the first terminal device 120 performs a sidelink transmission (for example, a sidelink transmission with a higher priority) to the second terminal device 130 or another terminal device during the sidelink slot 938, the first terminal device 120 may not be able to receive the sidelink transmissions (for example, data transmissions) from the second terminal device 130 due to the half-duplex nature of sidelink communications. In other words, the operations associated with the inactivity timer for sidelink communications may need to be different from the inactivity timer for downlink communications. This will be further detailed below with reference to FIG. 10.

Figure 10:
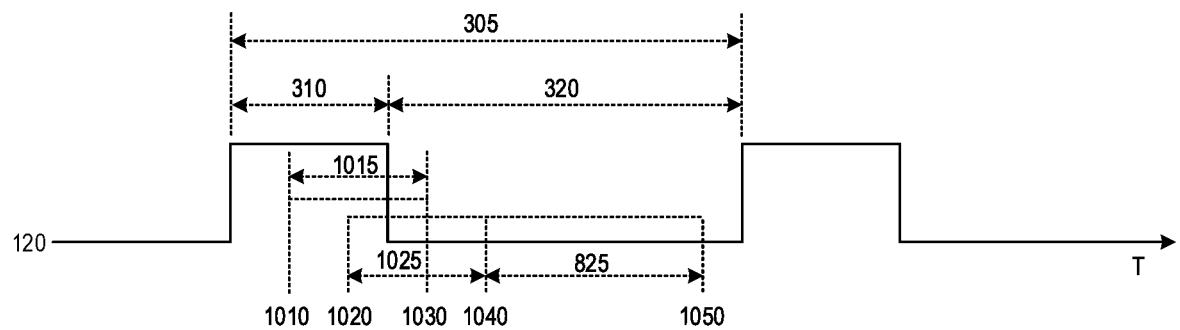
FIG. 10 shows an example of a third timer and an example of a fourth timer for sidelink DRX operations in accordance with some embodiments of the present disclosure.

FIG. 10 shows an example of a third timer and an example of a fourth timer for sidelink DRX operations in accordance with some embodiments of the present disclosure. As shown in FIG. 10, the first terminal device 120 performs sidelink DRX operations based on the sidelink DRX cycle 305 including the first duration 310 and the second duration 320. At a time point 1010, it is assumed that the first terminal device 120 receives a sidelink transmission (for example, a PSCCH) from the second terminal device 130. For example, the sidelink transmission may schedule a sidelink transmission of new data, such as, a PSSCH. In other words, the scheduled sidelink transmission is not a sidelink retransmission.

After detecting the sidelink transmission at the time point 1010, the first terminal device 120 may start a third timer indicating a third duration 1015 from the time point 1010 to a time point 1030. In some embodiments, the third timer has a similar function to the inactivity timer for DRX operations in downlink communications, for example, the "drx-InactivityTimer" as defined in the 3GPP specifications (for example, 3GPP TS 38.321). Therefore, as used herein, the third timer may also be referred to as an inactivity timer for sidelink communications or "drx-InactivityTimerSL." While the third timer is active, that is, during the duration 1015, the first terminal device 120 may keep awake to receive sidelink transmissions of the new data from the second terminal device 130.

At a time point 1020 while the third timer is active, it is assumed that the first terminal device 120 perform a sidelink transmission to the second terminal device 130 or another terminal device. As explained with reference to FIG. 9, the first terminal device 120 may fail to receive the sidelink transmission of the new data from the second terminal device 130 due to the sidelink transmission performed by the first terminal device 120. If a HARQ process is enabled for the sidelink transmission of the new data from the second terminal device 130 to the first terminal device 120, the second terminal device 130 may detect a discontinuous transmission (DTX) of the first terminal device 120, since there is neither a positive feedback (for example, an ACK) nor a negative feedback (for example, a NACK) from the first terminal device 120. After detecting the DTX of the first terminal device 120, the second terminal device 130 may prepare and perform a sidelink retransmission for the sidelink transmission to the first terminal device 120.

Accordingly, at the time point 1020 before the third timer expires, when the first terminal device 120 performs the sidelink transmission to the second terminal device 130 or another terminal device, the first terminal device 120 can start a fourth timer indicating a fourth duration 1025 from the time point 1020 to a time point 1040, for example, a number (such as 0, 1, 2, 4, 8, or other suitable numbers) of sidelink slots. In some embodiments, the fourth timer has a similar function to the first timer, for example, the "drx-HARQ-RTT-TimerSL" as described above. For example, while the fourth timer is active, namely, during the duration 1025, the sidelink retransmission from the second terminal device 130 to the first terminal device 120 would not occur due to the necessary time for the second terminal device 130 to prepare the sidelink retransmission. However, different from the first timer, in some embodiments, the first terminal device 120 can be in a wake-up mode or a sleep mode during the duration 1025, which may depends on the global sidelink DRX cycle and/or the group sidelink DRX cycle.

Another difference between the fourth timer and the first timer is that the first timer may be started due to a negative feedback from the first terminal device 120 to the second terminal device 130, whereas the fourth timer may be due to a DTX of the first terminal device 120 detected by the second terminal device 130. Therefore, as used herein, the fourth timer may also be referred to as "drx-HARQ-DTX-TimerSL."

Upon the fourth timer expires at the time point 1040, the first terminal device 120 may start the second timer indicating the second duration 825 from the time point 1040 to a time point 1050. As described above, while the second timer is active, that is, during the duration 825, the first terminal device 120 can keep awake and receive the expected sidelink retransmission from the second terminal device 130. In some embodiments, during the second duration 825 of the second timer, the first terminal device 120 can only receive the expected sidelink retransmission from the second terminal device 130. Thus, upon receiving the sidelink retransmission during the duration 825, the first terminal device 120 can stop the second timer. Alternatively, the first terminal device 120 may receive both the expected sidelink retransmission and any other sidelink transmissions from the second terminal device 130 and other terminal devices.

In summary, for HARQ-enabled cases, during the duration of the InactivityTimerSL indented for receiving PSCCHs/PSSCHs, if a UE transmitted a PSCCH/PSSCH at sidelink slot n, the UE can start the HARQ-DTX-TimerSL timer at slot n+1 and start the RetransmissionTimerSL timer after the expiry of the HARQ-DTX-TimerSL. The UE may stop the RetransmissionTimerSL timer if a sidelink retransmission of the corresponding HARQ process is received or the RetransmissionTimerSL expires. From a receiving UE's perspective, the UE may enter into the wake-up mode when the RetransmissionTimerSL timer is active. Therefore, the issue which arises if inactivity timer is interrupted by a sidelink transmission as explained with reference to FIG. 9 is well solved by the third and fourth timers.

In some embodiments, the third timer and the fourth timer can be indicated in the sidelink DRX configuration transmitted from the network device 110 to the first terminal device 120, for example, via RRC signaling or a MAC CE. Accordingly, the first terminal device 120 may determine the third timer and the fourth timer from the sidelink DRX configuration. It should be noted that the global sidelink DRX configuration and the group sidelink DRX configuration may have respective third timers, for example, a global-drx-InactivityTimerSL and a group-drx-InactivityTimerSL, and respective fourth timers, for example, a global-drx-HARQ-DTX-TimerSL and a group-drx-HARQ-DTX-TimerSL. Thus, the third timer and the fourth timer for the group sidelink DRX operations may be indicated in the group sidelink DRX configuration transmitted from a head terminal device to a member terminal device, for example, via RRC signaling or a MAC CE.

Figure 11:
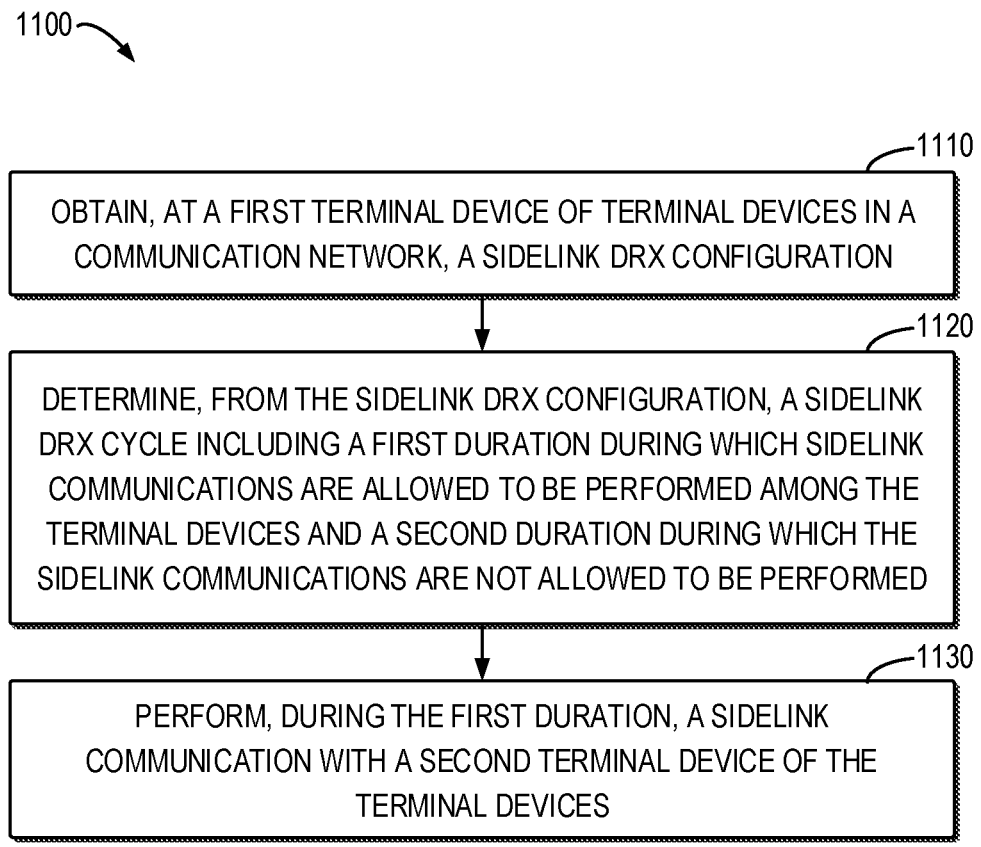
FIG. 11 shows a flowchart of an example method in accordance with some embodiments of the present disclosure.

FIG. 11 shows a flowchart of an example method 1100 in accordance with some embodiments of the present disclosure. In some embodiments, the method 1100 can be implemented at a terminal device, such as the first terminal device 120 as shown in FIG. 1. Additionally or alternatively, the method 1100 can also be implemented at the second terminal device 130, the third terminal device 140 or other terminal devices not shown in FIG. 1. For the purpose of discussion, the method 1100 will be described with reference to FIG. 1 as performed by the first terminal device 120 without loss of generality.

At block 1110, the first terminal device 120 obtains a sidelink DRX configuration. At block 1120, the first terminal device 120 determines, from the sidelink DRX configuration, a sidelink DRX cycle including a first duration during which sidelink communications are allowed to be performed among the terminal devices and a second duration during which the sidelink communications are not allowed to be performed. At block 1130, the first terminal device 120 performs, during the first duration, a sidelink communication with a second terminal device 130 of the terminal devices.

In some embodiments, performing the sidelink communication comprises: in accordance with a determination that a sidelink transmission is to be performed from the first terminal device 120 to the second terminal device 130, determining a starting time point of the first duration; determining an offset for performing the sidelink transmission; determining a target time point based on the starting time point and the offset; and performing the sidelink transmission at the target time point.

In some embodiments, the offset is determined based on at least one of the following: a priority of the sidelink transmission; a latency requirement of the sidelink transmission; a random manner; a predefined value; and a value indicated by a network device 110 in the communication network.

In some embodiments, performing the sidelink transmission at the target time point comprises one of: causing a transmission of a trigger from a higher layer to a physical layer of the first terminal device 120 to start after the offset, the trigger being used for triggering the physical layer to detect available resources for performing the sidelink transmission; causing the physical layer to detect the available resources after the offset; and causing a selection time window to start after the offset, the selection time window being used for selecting a resource from the available resources.

In some embodiments, the method 1100 further comprises: in accordance with a determination that the target time point is later than an ending time point of the first duration or is unable to meet a latency requirement of the sidelink transmission, setting the offset to be a predetermined value.

In some embodiments, the method 1100 further comprises: receiving, from a network device 110 in the communication network, an indication whether the offset is enabled or disabled.

In some embodiments, obtaining the sidelink DRX configuration comprises one of: receiving the sidelink DRX configuration from a network device 110 in the communication network; and determining the sidelink DRX configuration based on a predefined configuration.

In some embodiments, the method 1100 further comprises: receiving, from a network device 110 in the communication network, an indication whether the sidelink DRX configuration is enabled or disabled.

In some embodiments, the method 1100 further comprises: in accordance with a determination that the first terminal device 120 is a head terminal device of a group of the terminal devices in sidelink groupcast communications, transmitting a group sidelink DRX configuration to member terminal devices of the group; and determining, from the group sidelink DRX configuration, a group sidelink DRX cycle including a third duration and a fourth duration, the head terminal device being allowed to perform sidelink transmissions to the member terminal devices during the third duration, and being allowed to receive sidelink transmissions from the member terminal devices during the third and fourth durations.

In some embodiments, the group sidelink DRX configuration is transmitted using at least one of the following: a higher layer signal; a medium access control (MAC) control element (CE); and a periodical manner with a predefined period.

In some embodiments, the method 1100 further comprises: in accordance with a determination that there is no sidelink transmission to be performed to a target member terminal device of the member terminal devices during the third duration, transmitting an indication of entering into a power saving mode to the target member terminal device.

In some embodiments, the method 1100 further comprises: in accordance with a determination that the first terminal device 120 is one of member terminal devices of a group of the terminal devices in sidelink groupcast communications, obtaining a group sidelink DRX configuration; and determining, from the group sidelink DRX configuration, a group sidelink DRX cycle including a third duration and a fourth duration, the member terminal devices monitoring sidelink transmissions from a head terminal device of the group during the third duration.

In some embodiments, obtaining the group sidelink DRX configuration comprises one of: receiving the group sidelink DRX configuration from the head terminal device; and determining the group sidelink DRX configuration based on a predefined configuration.

In some embodiments, the group sidelink DRX configuration is received using at least one of the following: a higher layer signal; a medium access control (MAC) control element (CE); and a periodical manner with a predefined period.

In some embodiments, the method 1100 further comprises: in accordance with a determination that a duration for which the first terminal device 120 does not receive the group sidelink DRX configuration from the head terminal device exceeds the predefined period, determining that the group sidelink DRX configuration is disabled.

In some embodiments, the method 1100 further comprises: in accordance with receiving an indication of entering into a power saving mode from the head terminal device during the third duration, entering into the power saving mode in which the head terminal device is not to perform sidelink transmissions to the first terminal device 120.

In some embodiments, performing the sidelink communication with the second terminal device 130 comprises at least one of the following: performing a sidelink transmission to the second terminal device 130 during the first duration or a common portion of the first duration and the third duration; and receiving a sidelink transmission from the second terminal device 130 during both the first and the third durations.

In some embodiments, the second terminal device 130 is the head terminal device.

In some embodiments, the sidelink communication is a sidelink transmission from the second terminal device 130 to the first terminal device 120, the method further comprising: determining, from the sidelink DRX configuration, a first timer indicating a first duration including a first number of sidelink slots, the first timer being started from transmitting a negative feedback for the sidelink communication, receiving the sidelink transmission, or unsuccessfully decoding the sidelink transmission.

In some embodiments, the method 1100 further comprises: determining, from the sidelink DRX configuration, a second timer indicating a second duration before a sidelink retransmission for the sidelink transmission is received by the first terminal device 120, the second duration including a second number of sidelink slots, and the second timer being started when the first timer expires.

In some embodiments, the method 1100 further comprises: monitoring sidelink transmissions from the second terminal device 130 while the second timer is active.

In some embodiments, the method 1100 further comprises: determining, from the sidelink DRX configuration, a third timer indicating a third duration after detecting the sidelink transmission; and in accordance with a determination that the first terminal device 120 performs a sidelink transmission before the third timer expires, starting a fourth timer indicating a fourth duration; and in accordance with a determination that the fourth timer expires, starting the second timer.

Figure 12:
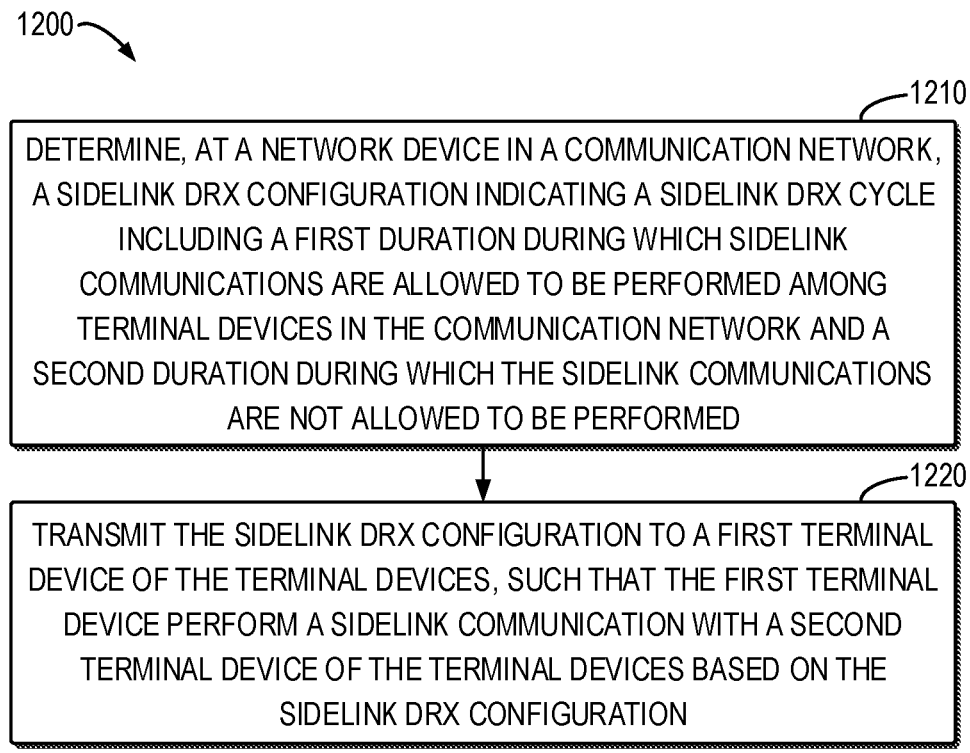
FIG. 12 shows a flowchart of another example method in accordance with some embodiments of the present disclosure.

FIG. 12 shows a flowchart of another example method 1200 in accordance with some embodiments of the present disclosure. In some embodiments, the method 1200 can be implemented at a network device, such as the network device 110 as shown in FIG. 1. Additionally or alternatively, the method 1200 can also be implemented at other network devices not shown in FIG. 1. For the purpose of discussion, the method 1200 will be described with reference to FIG. 1 as performed by the network device 110 without loss of generality.

At block 1210, the network device 110 determines a sidelink DRX configuration indicating a sidelink DRX cycle including a first duration during which sidelink communications are allowed to be performed among terminal devices in the communication network and a second duration during which the sidelink communications are not allowed to be performed. At block 1220, the network device 110 transmits the sidelink DRX configuration to a first terminal device 120 of the terminal devices, such that the first terminal device 120 performs a sidelink communication with a second terminal device 130 of the terminal devices based on the sidelink DRX configuration.

In some embodiments, the method 1200 further comprises at least one of the following: transmitting, to the first terminal device 120, an indication whether the sidelink DRX configuration is enabled or disabled; transmitting, to the first terminal device 120, an indication of an offset for the first terminal device 120 to perform a sidelink transmission to the second terminal device 130; and transmitting, to the first terminal device 120, an indication whether the offset is enabled or disabled.

In some embodiments, the sidelink communication is a sidelink transmission from the second terminal device 130 to the first terminal device 120, the sidelink DRX configuration further indicating at least one of the following: a first timer indicating a first duration including a first number of sidelink slots, the first timer being started from transmitting a negative feedback for the sidelink communication, receiving the sidelink transmission, or unsuccessfully decoding the sidelink transmission; a second timer indicating a second duration before a sidelink retransmission for the sidelink transmission is received by the first terminal device 120, the second duration including a second number of sidelink slots, and the second timer being started when the first timer expires; a third timer indicating a third duration after detecting the sidelink transmission; and a fourth timer indicating a fourth duration after the first terminal device 120 performs a sidelink transmission before the third timer expires, the second timer being started when the fourth timer expires.

Figure 13:
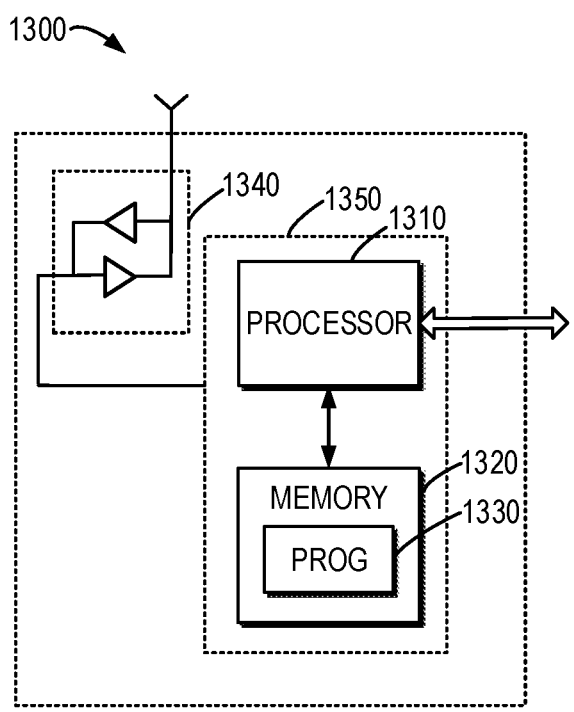
FIG. 13 is a simplified block diagram of a device that is suitable for implementing some embodiments of the present disclosure.

FIG. 13 is a simplified block diagram of a device 1300 that is suitable for implementing some embodiments of the present disclosure. The device 1300 can be considered as a further example embodiment of the first terminal device 120, the second terminal device 130, the third terminal device 140, and the network device 110 as shown in FIG. 1. Accordingly, the device 1300 can be implemented at or as at least a part of the first terminal device 120, the second terminal device 130, the third terminal device 140, and the network device 110.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1330 is assumed to include program instructions that, when executed by the associated processor 1310, enable the device 1300 to operate in accordance with the embodiments of the present disclosure, as discussed herein with reference to FIGS. 11 and 12.

The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 11 and 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first terminal, the method comprising:
deriving an offset based on an identifier of a second terminal; and
performing, at a target timing during a first duration within a sidelink discontinuous reception (DRX) cycle, a sidelink communication from the first terminal to the second terminal, the target timing being a timing after a time corresponding to the offset from a start timing of the first duration,
wherein a first timer is started from transmitting a negative feedback for a first sidelink transmission from the second terminal to the first terminal, the first timer indicating a duration including a first number of sidelink slots, wherein a second timer is started when the first timer expires, the second timer indicating a second duration before a sidelink retransmission for the first sidelink transmission is received by the first terminal, and wherein the method further comprises:
  determining a third timer indicating a third duration after detecting the first sidelink transmission;
  in accordance with a determination that the first terminal performs a second sidelink transmission before the third timer expires starting a fourth timer indicating a fourth duration: and
  in accordance with a determination that the fourth timer expires, starting the second timer.

2. The method according to claim 1, comprising:
monitoring first sidelink transmissions from the second terminal while the second timer is active.

3. The method according to claim 1, wherein
the first terminal is a member of a group of terminal devices in sidelink groupcast communications.

4. A first terminal comprising:
a processor configured to:
  derive an offset based on an identifier of a second terminal; and
  perform, at a target timing during a first duration within a sidelink discontinuous reception (DRX) cycle, a sidelink communication from the first terminal to the second terminal, the target timing being a timing after a time corresponding to the offset from a start timing of the first duration, wherein a first timer is started from transmitting a negative feedback for a first sidelink transmission from the second terminal to the first terminal, the first timer indicating a duration including a first number of sidelink slots, wherein a second timer is started when the first timer expires, the second timer indicating a second duration before a sidelink retransmission for the first sidelink transmission is received by the first terminal, and wherein the processor is further configured to:
  determine a third timer indicating a third duration after detecting the first sidelink transmission;
  in accordance with a determination that the first terminal performs a second sidelink transmission before the third timer expires, start a fourth timer indicating a fourth duration; and
  in accordance with a determination that the fourth timer expires, start the second timer.

5. The first terminal according to claim 4, wherein the processor is further configured to:
monitor first sidelink transmissions from the second terminal while the second timer is active.

6. The first terminal according to claim 4, wherein
the first terminal is a member of a group of terminal devices in sidelink groupcast communications.

* * * * *